US012650790B2

(12) United States Patent　　　(10) Patent No.:　　US 12,650,790 B2
Kim　　　　　　　　　　　　　　　(45) Date of Patent:　　　Jun. 9, 2026

(54) MEMORY SYSTEM AND METHOD FOR PROCESSING READ COMMANDS FOR A TARGET ADDRESS

(71) Applicant: SK hynix Inc., Icheon-si (KR)

(72) Inventor: Du Hyun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/968,899

(22) Filed: Dec. 4, 2024

(65) Prior Publication Data

US 2026/0050398 A1　　Feb. 19, 2026

(30) Foreign Application Priority Data

Aug. 16, 2024　(KR) ........................ 10-2024-0109636

(51) Int. Cl.
*G06F 3/06*　　　　(2006.01)
(52) U.S. Cl.
CPC .......... *G06F 3/0659* (2013.01); *G06F 3/0619* (2013.01); *G06F 3/0673* (2013.01)

(58) Field of Classification Search
CPC ..... G06F 3/0659; G06F 3/0673; G06F 3/0619
See application file for complete search history.

(56) References Cited

U.S. PATENT DOCUMENTS

| | | | |
|---|---|---|---|
| 2021/0303173 A1* | 9/2021 | Wu ........................ | G06F 3/0611 |
| 2022/0091984 A1* | 3/2022 | Das ........................ | G06F 3/0616 |
| 2023/0129791 A1 | 4/2023 | Teh et al. | |
| 2025/0094055 A1* | 3/2025 | Inakagata ............... | G06F 3/061 |

FOREIGN PATENT DOCUMENTS

KR　　10-2012-0064576 A　　6/2012

* cited by examiner

*Primary Examiner* — Jane W Benner

(57) ABSTRACT

A memory system may include a memory media and a controller. The controller may receive from a host a first read command which requests to read target data stored in a target address of the memory media, read the target data from the memory media, store the read target data in a buffer, generate a first response message to the first read command on the basis of the read target data, receive, after receiving the first read command, from the host a second read command which requests to read the target data, and generate a second response message to the second read command on the basis of the target data stored in the buffer.

6 Claims, 7 Drawing Sheets

Receive first read command from host    ~S710

Read target data from random access memory    ~S720

Store read target data in buffer    ~S730

Receive second read command from host    ~S740

Generate first response message and second response message    ~S750

MEMORY SYSTEM AND METHOD FOR PROCESSING READ COMMANDS FOR A TARGET ADDRESS

CROSS-REFERENCE TO RELATED APPLICATION

The present application claims priority under 35 U.S.C. § 119(a) to Korean Patent Application No. 10-2024-0109636 filed in the Korean Intellectual Property Office on Aug. 16, 2024, which is incorporated herein by reference in its entirety.

BACKGROUND

1. Technical Field

Embodiments of the present disclosure relate to a memory system and a method for processing a plurality of read commands for a target address.

2. Related Art

A memory system may store data and may be implemented using volatile memory or nonvolatile memory. In volatile memory (e.g., SRAM or DRAM), stored data is lost when the power supply is cut off, and in nonvolatile memory (e.g., NAND flash, PRAM or MRAM), stored data is kept and maintained even if the power supply is cut off.

A memory system may receive, from a host, a read command that requests read data. While the memory system is processing the read command for an address, the memory system may additionally receive a subsequent read command for the same address.

SUMMARY

Various embodiments of the present disclosure are directed to providing a memory system and a method capable of improving the processing time for a plurality of read commands for the same target address.

In an aspect, a memory system may include: a memory media; and a controller configured to receive a read command from a host, read data according to the read command from the memory media, and generate a response message to the read command on the basis of the data read from the memory media.

The controller may include a buffer that stores the data read from the memory media. The controller may receive from the host a first read command for a target data stored at a target address of the memory media, read the target data from the memory media, store the read target data in the buffer, generate a first response message to the first read command on the basis of the read target data, and wherein the controller receives from the host, after receiving the first read command, a second read command for the target data stored at the target address, and generates a second response message to the second read command on the basis of the target data stored in the buffer.

In another aspect, a method for operating a memory system may include: receiving, from a host, a first read command that requests reading of a target data stored in a target address of a memory media; reading the target data from the memory media; storing the target data in a buffer; receiving, from the host, a second read command that requests reading of the target data stored in the target address, after receiving the first read command; and generating a first response message to the first read command and a second response message to the second read command.

The generating a first response message and a second response message may generate the first response message on the basis of the target data read from the memory media and generate the second response message on the basis of the target data stored in the buffer.

According to the embodiments of the present disclosure, it is possible to process more quickly a plurality of read commands for a target address.

DETAILED DESCRIPTION

Figure 1:
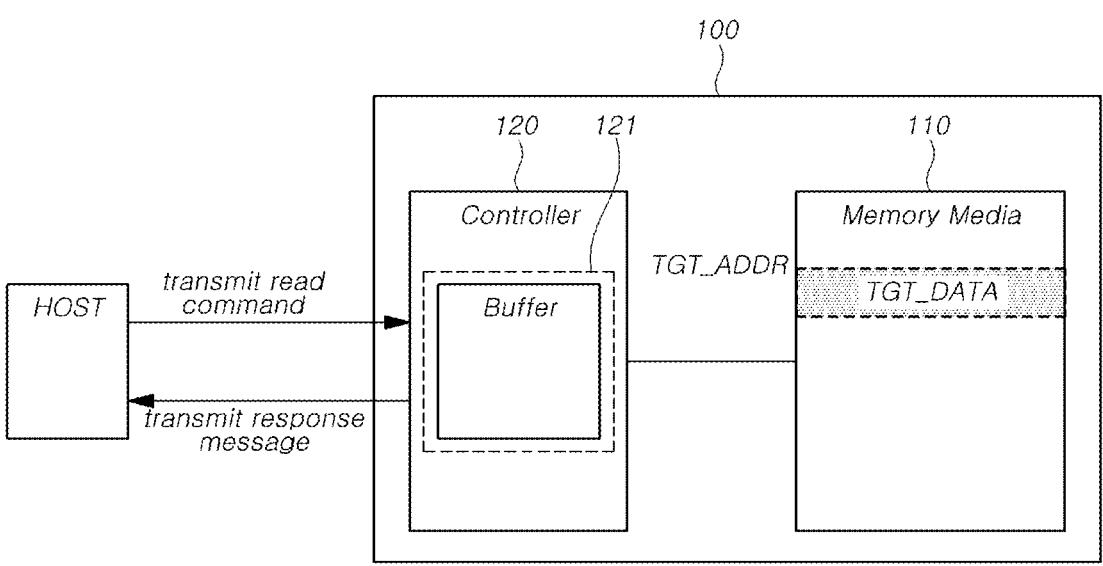
FIG. 1 is a schematic configuration diagram of a memory system according to embodiments of the present disclosure.

Hereinafter, embodiments of the present disclosure are described in detail with reference to the accompanying drawings. Throughout the specification, reference to "an embodiment," "another embodiment" or the like is not necessarily referring to only one embodiment, and different references to such phrases are not necessarily limited to the same embodiment(s). The term "embodiments" when used herein does not necessarily refer to all embodiments within the scope of the disclosure.

Various embodiments of the present disclosure are described below in more detail with reference to the accompanying drawings. However, the present disclosure may be embodied in different forms and variations, and should not be construed as being limited to the embodiments set forth herein. Rather, the described embodiments are provided so that this disclosure will be thorough and complete, and will fully convey the present disclosure to those skilled in the art to which this disclosure pertains. Throughout the disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a memory system according to embodiments of the present disclosure.

Referring to FIG. 1, a memory system 100 may include a memory media 110 and a controller 120.

The memory media 110 may store target data TGT_DATA. The target data TGT_DATA may be stored in a target address TGT_ADDR of the memory media 110. That is to say, an area where the target data TGT_DATA is stored in the memory media 110 may be identified through the target address TGT_ADDR.

The memory media 110 may be implemented in various ways.

For example, the memory media 110 may be implemented by a random access memory media. The memory media 110 may include a plurality of banks, may store data in the plurality of banks and read stored data from the plurality of banks.

The memory media 110 may perform a periodic refresh operation to maintain stored data. When power supply to the memory media 110 is cut off, data stored in the memory media 110 is lost.

In another example, the memory media 110 may be implemented with a nonvolatile memory media (e.g., NAND Flash, PRAM or MRAM).

The controller 120 may receive a read command from a host. The controller 120 may read data requested by the read command from the memory media 110, and then, may generate a response message to the read command on the basis of the read data. The controller 120 may transmit the generated response message to the host.

The controller 120 may store the received read command in the controller 120 until the controller 120 transmits the response message to the received read command to the host.

The controller 120 may include a buffer 121, which stores data read from the memory media 110.

The controller 120 and the buffer 121 may be implemented in various ways.

For example, the controller 120 may be implemented by an integrated circuit, which includes logic gates for executing the above-described operation. The controller 120 may be implemented by an application specific integrated circuit (ASIC) or a field programmable gate array (FPGA).

In another example, the controller 120 may include a processor that performs calculations to control the processing of a plurality of operation requests and to control a working memory, which stores data necessary to process the plurality of operation requests.

For example, the processor may control the operation of the controller 120 by executing firmware. The processor may drive the firmware to control overall operations of the controller 120 and to perform logic calculations. The firmware, as program which is executed in the controller 120 to drive the controller 120, may include binary data in which codes for executing the above-described overall operations and logic calculations are defined.

The firmware may be stored in a storage space (e.g., working memory, ROM or flash) that is located inside or outside the controller 120. The processor may load the entirety or a part of the firmware stored in the storage space.

The working memory may store data (e.g., a plurality of operation requests or firmware) necessary for the controller 120 to process a plurality of operation requests. For example, the working memory may include a separate volatile memory (e.g., SRAM).

For example, the buffer 121 may be implemented by separate register, volatile memory (e.g., SRAM), nonvolatile memory (e.g., NAND Flash, NOR Flash, PRAM or MRAM), or the like.

In another example, when the controller 120 includes a working memory, the buffer 121 may be implemented by the working memory.

Figure 2:
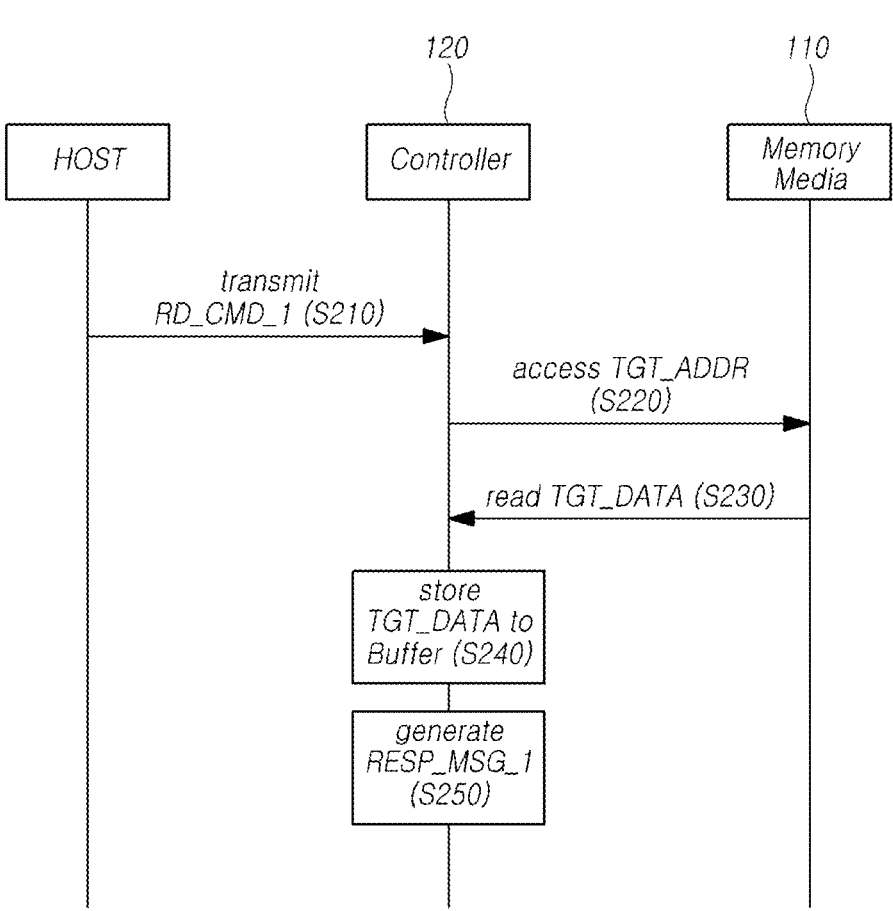
FIG. 2 is a diagram illustrating an operation in which a memory system processes a first read command according to an embodiment of the present disclosure.

FIG. 2 is a diagram illustrating an operation in which a memory system processes a first read command according to an embodiment of the present disclosure.

Referring to FIG. 2, a host may transmit the first read command RD_CMD_1 to a controller 120 of a memory system 100 (S210). The first read command RD_CMD_1 is a command that requests a read of target data TGT_DATA stored at a target address TGT_ADDR of a memory media 110.

After receiving the first read command RD_CMD_1, the controller 120 may access the memory media 110 using the target address TGT_ADDR (S220) and read the target data TGT_DATA (S230).

The controller 120 may store the read target data TGT_DATA in a buffer 121 (S240).

The controller 120 may generate a first response message RESP_MSG_1, which is a response message to the first read command RD_CMD_1, on the basis of the read target data TGT_DATA (S250).

The controller 120 may additionally receive another command from the host, from a time point at which the first read command RD_CMD_1 is received to a time point at which the first response message RESP_MSG_1 is generated. This will be described below in detail with reference to FIG. 3.

Figure 3:
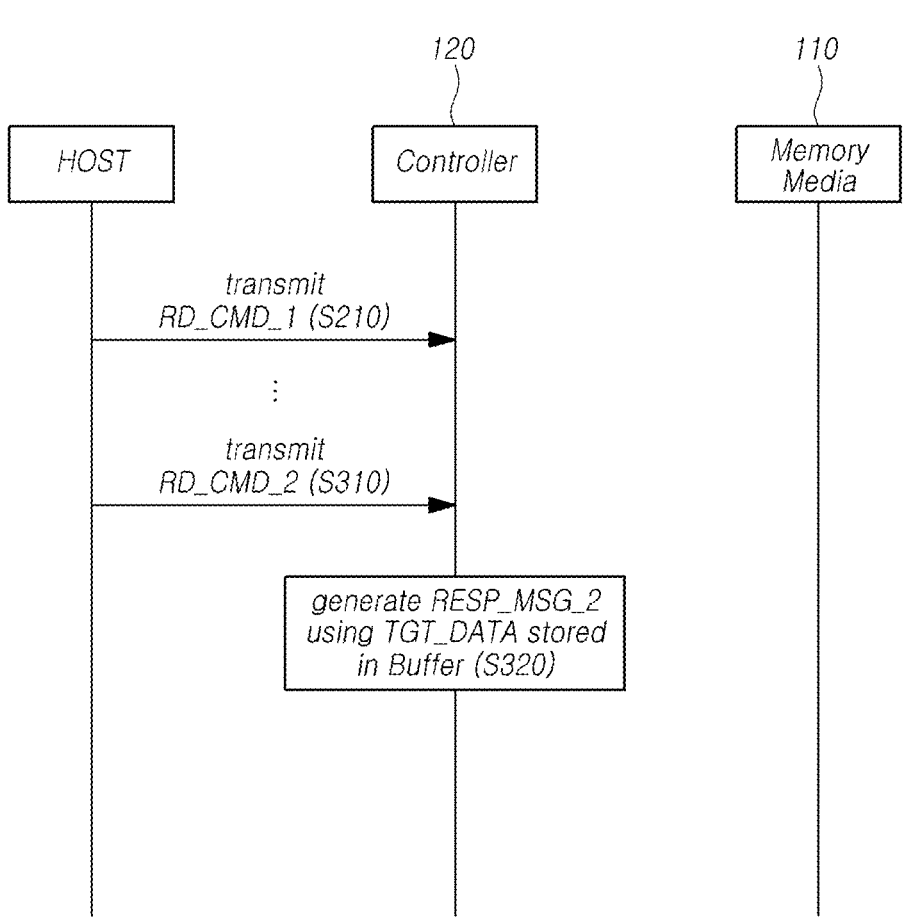
FIG. 3 is a diagram illustrating an operation in which a memory system processes a second read command according to an embodiment of the present disclosure.

FIG. 3 is a diagram illustrating an operation in which a memory system processes a second read command.

As described above with reference to FIG. 2, a host may transmit a first read command RD_CMD_1 to a controller 120 of a memory system 100 (S210).

The host may transmit a second read command RD_CMD_2 to the controller 120 (S310). The host may transmit the second read command RD_CMD_2 to the controller 120 after transmitting the first read command RD_CMD_1.

Like the first read command RD_CMD_1, the second read command RD_CMD_2 is a command that requests the reading of target data TGT_DATA stored at a target address TGT_ADDR of a memory media 110. In other words, the first read command RD_CMD_1 and the second read command RD_CMD_2 are read commands that require access to the same address.

Thereafter, the controller 120 may generate a second response message RESP_MSG_2, which is a response message to the second read command RD_CMD_2, on the basis of the target data TGT_DATA stored in a buffer 121 (S320). Step S320 may be executed after step S240 described above with reference to FIG. 2.

While the controller 120 must access the memory media 110 to generate the first response message RESP_MSG_1, the controller 120 does not separately access the memory media 110 in the process of generating the second response message RESP_MSG_2. This is because the target data TGT_DATA is already stored in the buffer 121, and thus the second response message RESP_MSG_2 may be generated without accessing the memory media 110.

Therefore, by preventing the same target data TGT_DATA from being repeatedly read from the memory media 110, the controller 120 may more quickly process a plurality of read commands directed to the same target address TGT_ADDR.

In this process, the controller 120 needs to manage the first read command RD_CMD_1 and the second read command RD_CMD_2 as commands to read target data TGT_DATA stored at the same target address TGT_ADDR.

Hereunder, a method in which the controller 120 manages the first read command RD_CMD_1 and the second read command RD_CMD_2 will be described.

Figure 4:
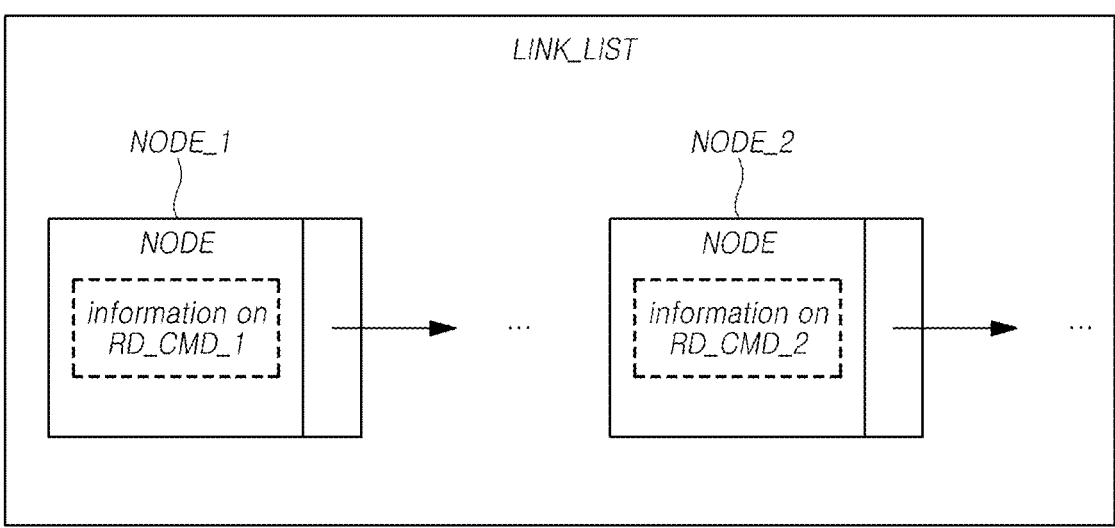
FIG. 4 is a diagram illustrating a link list according to embodiments of the present disclosure.

FIG. 4 is a diagram illustrating a link list according to embodiments of the present disclosure.

Referring to FIG. 4, a controller 120 may generate a link list LINK_LIST, which stores information associated with read commands for reading target data TGT_DATA.

The link list LINK_LIST may include one or more nodes NODE. Each node may correspond to a specific read command, and may include information about the corresponding read command (e.g., a read command, a location where the read command is stored, the index of the read command and an address of a memory media 110 for the data requested by the read command).

In addition, each node may further include a pointer that indicates a subsequent node. Nodes included in the link list LINK_LIST may be linked to each other through pointers that indicate subsequent nodes, respectively.

Accordingly, by traversing the nodes included in the link list LINK_LIST, the controller 120 may access information about each read command requesting to read the target data TGT_DATA.

A read command currently being processed may correspond to a node in the link list LINK_LIST, and the next read command to be processed will correspond to a node subsequent to the node corresponding to the read command currently being processed. When a subsequent node does not exist, the controller 120 may determine that there is no further read command to be processed.

Accordingly, the controller 120 may determine whether a next read command exists by searching for a subsequent node in a link list LINK_LIST. As a result, the controller 120 may more quickly generate a response to a subsequent read command to be processed next.

Response messages to read commands, corresponding to all nodes in the link list LINK_LIST except for a first inserted node, may be generated using the target data TGT_DATA stored in the buffer 121. As a result, the controller 120 may more quickly determine whether to generate a response message to a read command by using the target data TGT_DATA stored in the buffer 121.

After generating the link list LINK_LIST, the controller 120 may insert a first node NODE_1 including information associated with the first read command RD_CMD_1 into the link list LINK_LIST. The first node NODE_1 may be a node that is the first node inserted into the link list LINK_LIST.

After inserting the first node NODE_1 into the link list LINK_LIST, the controller 120 may insert a second node NODE_2 including information about the second read command RD_CMD_2 into the link list LINK_LIST.

Since the first read command RD_CMD_1 is received before the second read command RD_CMD_2, the controller 120 may insert the first node NODE_1 into the link list LINK_LIST before the second node NODE_2.

Nodes corresponding to other read commands that request the reading of the target data TGT_DATA, in addition to the first read command RD_CMD_1 and the second read command RD_CMD_2, may be inserted similarly into the link list LINK_LIST.

Among the nodes inserted into the link list LINK_LIST, a node corresponding to a read command to which a response message is transmitted to the host may be deleted from the link list LINK_LIST. The controller 120 may maintain in the link list LINK_LIST only nodes corresponding to read commands to which a response message has not yet been transmitted to the host. This will be described below in detail with reference to FIG. 5.

Figure 5:
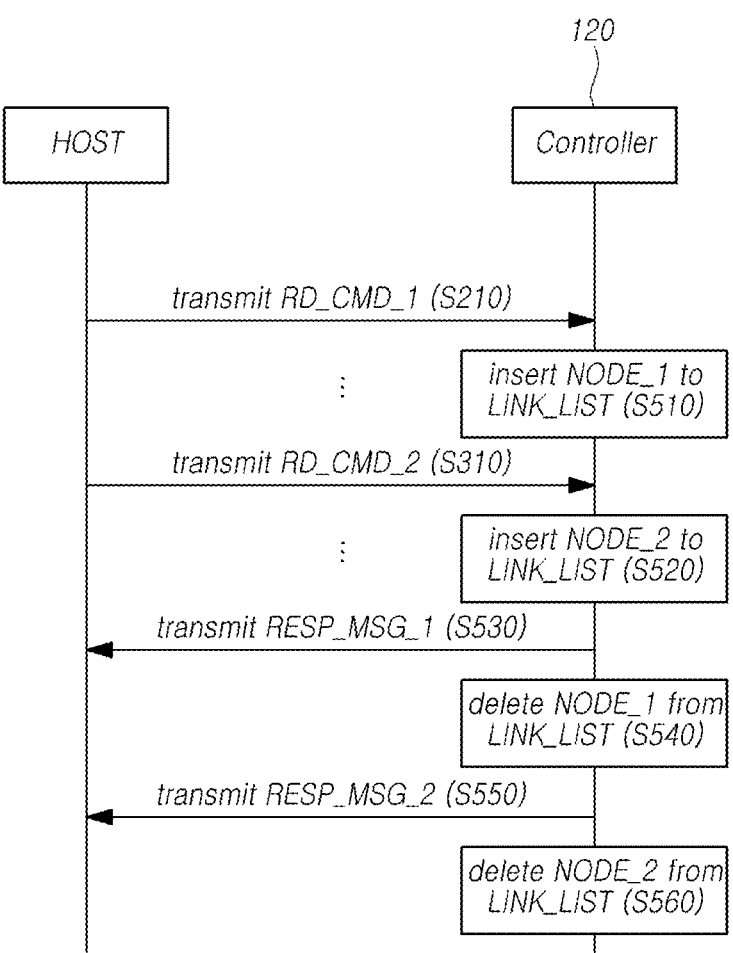
FIG. 5 is a diagram illustrating an operation in which a memory system inserts and deletes a first node and a second node in a link list according to an embodiment of the present disclosure.

FIG. 5 is a diagram illustrating an operation in which a memory system inserts and deletes a first node and a second node NODE_2 in a link list according to an embodiment of the present disclosure.

As described above, a controller 120 of a memory system 100 may receive a first read command RD_CMD_1 from a host (S210). Thereafter, the controller 120 may insert a first node NODE_1 including information associated with the first read command RD_CMD_1 into a link list LINK_LIST (S510).

The controller 120 may receive a second read command RD_CMD_2 from the host (S310). In FIG. 5, step S510 is executed before step S310, but in other embodiments, step S510 may be executed after step S310.

The controller 120 may insert a second node NODE_2 including information pertaining to the second read command RD_CMD_2 into the link list LINK_LIST (S520).

Thereafter, the controller 120 may transmit a first response message RESP_MSG_1, in response to the first read command RD_CMD_1, to the host (S530). Next, the controller 120 may delete the first node NODE_1 from the link list LINK_LIST (S540).

The controller 120 may transmit the second response message RESP_MSG_2, in response to the second read command RD_CMD_2, to the host (S550). In FIG. 5, step S550 is executed after step S530 and step S540, but in other embodiments, step S550 may be executed before at least one of step S530 and step S540.

Thereafter, the controller 120 may delete the second node NODE_2 from the link list LINK_LIST (S560).

While the memory system 100 processes the first read command RD_CMD_1 and the second read command RD_CMD_2, the memory system 100 may suspend an operation of processing a write command for the target address TGT_ADDR. This will be described below in detail with reference to FIG. 6.

Figure 6:
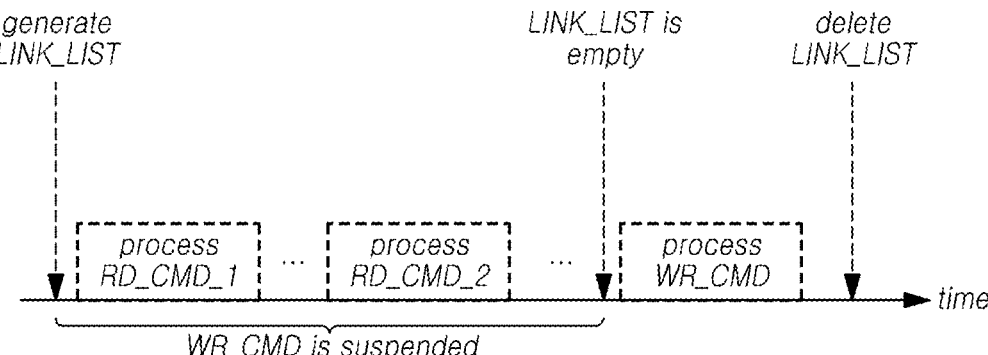
FIG. 6 is a diagram illustrating an operation in which a memory system processes a write command according to an embodiment of the present disclosure.

FIG. 6 is a diagram illustrating an operation in which a memory system processes a write command according to an embodiment of the present disclosure.

A controller 120 of a memory system 100 may suspend an operation of processing a write command WR_CMD, from a time point at which a link list LINK_LIST is generated to a time point at which the link list LINK_LIST becomes an empty list.

The link list LINK_LIST is an empty list when the link list LINK_LIST does not include any node.

When the link list LINK_LIST is not an empty list, in order to prevent an error from occurring due to a write command WR_CMD while the controller 120 is processing a read command for the target data TGT_DATA, the controller 120 may suspend an operation of processing the write command WR_CMD.

The write command WR_CMD is a command that requests the writing of new data, which is different from the target data TGT_DATA, to the target address TGT_ADDR.

The write command WR_CMD is a command that is received from a host after the controller 120 receives a first read command RD_CMD_1 and a second read command RD_CMD_2.

In response to read commands for the target address TGT_ADDR received before the write command WR_CMD, the controller 120 should transmit the target data TGT_DATA previously stored in the target address TGT_ADDR to the host, instead of new data associated with the write command WR_CMD.

When processing is completed for the read commands for the target address TGT_ADDR received before the write command WR_CMD, the link list LINK_LIST becomes an empty list. Therefore, the controller 120 may suspend the operation of processing the write command WR_CMD until the link list LINK_LIST becomes an empty list, thereby preventing the occurrence of any errors due to processing of the write command WR_CMD.

After the link list LINK_LIST becomes an empty list, the controller 120 may process the write command WR_CMD and may delete the link list LINK_LIST.

Figure 7:
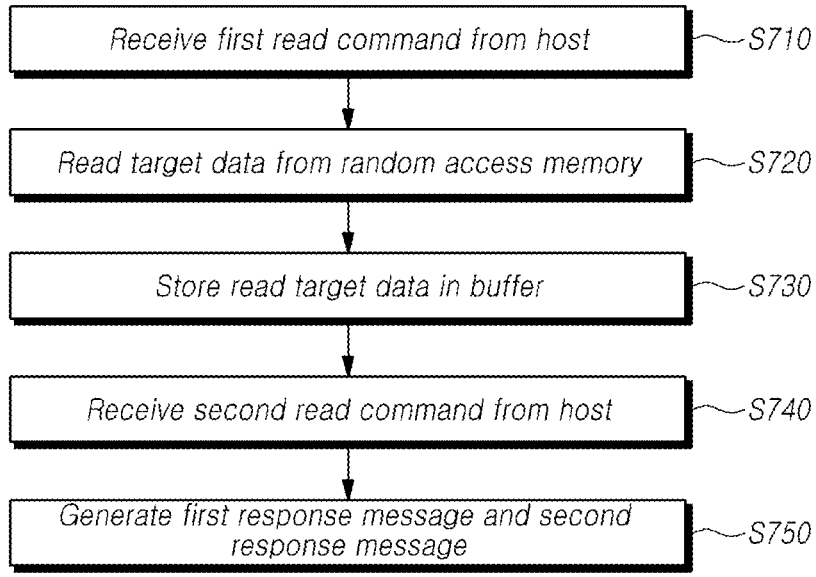
FIG. 7 is a diagram illustrating a method for operating a memory system according to embodiments of the present disclosure.

FIG. 7 is a diagram illustrating a method for operating a memory system according to embodiments of the present disclosure.

Referring to FIG. 7, a method for operating a memory system 100 may include step S710 of receiving, from a host, a first read command RD_CMD_1 that requests target data TGT_DATA stored in a target address TGT_ADDR of a memory media 110.

The method for operating the memory system 100 may include step S720 of reading the target data TGT_DATA from the memory media 110.

The method for operating the memory system 100 may include step S730 of storing the read target data TGT_DATA in a buffer 121.

The method for operation the memory system 100 may include step S740 of receiving, from the host, a second read command RD_CMD_2 that requests the target data TGT_DATA stored in the target address TGT_ADDR, after receiving the first read command RD_CMD_1.

The method for operating the memory system 100 may include step S750 of generating a first response message RESP_MSG_1 to the first read command RD_CMD_1 and a second response message RESP_MSG_2 to the second read command RD_CMD_2.

In step S750, the first response message RESP_MSG_1 is generated on the basis of the target data TGT_DATA read from the memory media 110, but the second response message RESP_MSG_2 is generated on the basis of the target data TGT_DATA stored in the buffer 121.

The method for operating the memory system 100 may further include a step of generating a link list LINK_LIST, which stores information associated with read commands requesting to read the target data TGT_DATA; a step of inserting, after receiving the first read command RD_CMD_1, a first node NODE_1 that includes information about the first read command RD_CMD_1, into the link list LINK_LIST; and a step of inserting, after receiving the second read command RD_CMD_2, a second node NODE_2 that includes information pertaining to the second read command RD_CMD_2, into the link list LINK_LIST.

The method for operating the memory system 100 may further include a step of deleting the first node NODE_1 from the link list LINK_LIST after transmitting the first response message RESP_MSG_1 to the host; and a step of deleting the second node NODE_2 from the link list LINK_LIST after transmitting the second response message RESP_MSG_2 to the host.

The method for operating the memory system 100 may further include a step of suspending an operation of processing a write command WR_CMD for the target address TGT_ADDR, from a time point at which the link list LINK_LIST is generated to a time point at which the link list LINK_LIST becomes an empty list.

The write command WR_CMD is a command that requests the writing, to the target address TGT_ADDR, data that is different from the target data TGT_DATA. The write command WR_CMD may be received from the host by the controller 120 after the first read command RD_CMD_1 and the second read command RD_CMD_2 are received.

The method for operating the memory system 100 may further include a step of deleting the link list LINK_LIST when processing the write command WR_CMD or after the processing is complete.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A memory system comprising:

a memory media; and a controller configured to receive a read command from a host, read data according to the read command from the memory media, and generate a response message to the read command on the basis of the data read from the memory media, wherein the controller includes a buffer that stores the data read from the memory media, wherein the controller receives from the host a first read command for a target data stored at a target address of the memory media, reads the target data from the memory media, stores the read target data in the buffer, generates a first response message to the first read command on the basis of the read target data, wherein the controller receives from the host, after receiving the first read command, a second read command for the target data stored at the target address, and generates a second response message to the second read command on the basis of the target data stored in the buffer, wherein the controller generates a link list that stores information associated with read commands to read the target data, inserts into the link list a first node that includes information associated with the first read command, and, after inserting the first node into the link list, inserts into the link list a second node that includes information associated with the second read command, wherein the controller deletes the first node from the link list after transmitting the first response message to the host, and deletes the second node from the link list after transmitting the second response message to the host, and wherein the controller suspends an operation of processing a write command, from a time point at which the link list is generated to a time point at which the link list becomes an empty list.

2. The memory system according to claim 1, wherein the write command is a command that requests writing of a new data to the target address and the write command is received from the host after the first read command and the second read command.

3. The memory system according to claim 2, wherein the controller deletes the link list when processing the write command.

4. A method for operating a memory system, comprising:

receiving, from a host, a first read command that requests reading of a target data stored in a target address of a memory media;

reading the target data from the memory media;

storing the target data in a buffer;

receiving, from the host, a second read command that requests reading of the target data stored in the target address, after receiving the first read command;

generating a first response message to the first read command on the basis of the target data read from the memory media;

generating a second response message to the second read command on the basis of the target data stored in the buffer;

generating a link list that stores information about read commands requesting reading of the target data;

inserting into the link list, after receiving the first read command, a first node that includes information about the first read command;

inserting into the link list, after receiving the second read command, a second node that includes information about the second read command;

deleting the first node from the link list after transmitting the first response message to the host;

deleting the second node from the link list after transmitting the second response message to the host; and suspending an operation of processing a write command for the target address from a time point at which the link list is generated to a time point at which the link list becomes an empty list.

5. The method according to claim 4, further comprising:

wherein the write command is a command that requests writing a new data to the target address, and wherein the write command is received from the host after the first read command and the second read command.

6. The method according to claim 5, further comprising:

deleting the link list when processing the write command.

\* \* \* \* \*